(12) United States Patent
Stommel

(10) Patent No.: US 7,683,498 B2
(45) Date of Patent: Mar. 23, 2010

(54) METHOD FOR OPERATION OF A WIND ENERGY INSTALLATION

(75) Inventor: Matthias Stommel, Ganderkesee (DE)

(73) Assignee: Daubner & Stommel GBR Bau-Werk-Planug (DE)

(*) Notice: Subject to any disclaimer, the term of this patent is extended or adjusted under 35 U.S.C. 154(b) by 213 days.

(21) Appl. No.: 11/686,430

(22) Filed: Mar. 15, 2007

(65) Prior Publication Data
US 2008/0042440 A1  Feb. 21, 2008

(30) Foreign Application Priority Data
Jul. 4, 2006  (DE) .................. 10 2006 031 144

(51) Int. Cl.
*F03D 9/00* (2006.01)
*H02P 9/04* (2006.01)

(52) U.S. Cl. .................. 290/44; 290/55; 416/1
(58) Field of Classification Search .................. 290/44, 290/55; 416/142, 132 B, 227 A, 1; 415/4.4, 415/4.5, 2.1
See application file for complete search history.

(56) References Cited

U.S. PATENT DOCUMENTS

| 4,011,694 A * | 3/1977 | Langford .................. 52/1 |
| 4,792,700 A * | 12/1988 | Ammons .................. 290/55 |
| 5,062,765 A * | 11/1991 | McConachy .................. 415/4.3 |
| 5,146,096 A | 9/1992 | McConachy |
| 5,182,458 A * | 1/1993 | McConachy .................. 290/55 |
| 5,252,029 A * | 10/1993 | Barnes .................. 416/142 |
| 7,508,088 B2 * | 3/2009 | Kothnur et al. .................. 290/44 |
| 2004/0197188 A1* | 10/2004 | Drake .................. 415/4.1 |
| 2005/0082839 A1* | 4/2005 | McCoin .................. 290/55 |

FOREIGN PATENT DOCUMENTS

| DE | 100 33 183 A1 | 7/2000 |
| DE | 103 09 825 A1 | 3/2003 |
| DE | 103 09 825 A1 | 9/2004 |
| EP | 1 741 928 A | 1/2007 |
| JP | 06 339215 A | 12/1994 |
| WO | 02-05041 A | 1/2002 |

OTHER PUBLICATIONS

DE Search Report No. 10 2006 031 144.2 dated Nov. 17, 2006.
International Search Report (2PGS).
Government of India Patent Office SUB: First Examination Report (Sep. 4, 2009).

* cited by examiner

*Primary Examiner*—Julio Gonzalez
(74) *Attorney, Agent, or Firm*—Smith, Gambrell & Russell

(57) ABSTRACT

A method for operation of a wind energy installation having a rotor (18) which can be driven by wind and has at least one rotor blade (22), a generator for conversion of the mechanical energy of the rotor (18) to electrical energy, a tower (14) on which the rotor (18) is arranged, and to guy the wind energy installation (10) a guy apparatus that is changed as required automatically from an unstressed state which stabilizes the wind energy installation (10), and a wind energy installation having these features.

17 Claims, 1 Drawing Sheet

METHOD FOR OPERATION OF A WIND ENERGY INSTALLATION

STATEMENT OF RELATED APPLICATIONS

This patent application is based on and claims priority on German Patent Application No. 10 2006 031 144.2 having a filing date of 4 Jul. 2006.

BACKGROUND OF THE INVENTION

1. Technical Field

The present invention relates to a method for operation of a wind energy installation having a rotor which can be driven by wind and has at least one rotor blade, having a generator for conversion of the mechanical energy of the rotor to electrical energy, and having a tower on which the rotor is arranged. The present invention also relates to a wind energy installation which is operated using this method.

2. Prior Art

Wind energy installations are subject to particularly high loads in strong winds. Wind energy installations are generally designed such that, in the extreme, they can withstand wind speeds which correspond to those of the so-called once-a-century gust.

However, even in Europe, extreme wind conditions are occurring ever more frequently, with wind speeds which may be above the once-a-century gust. Furthermore, for example in the USA or Australia, there are wind energy installation locations at which it is possible for cyclones or the like to occur. Cyclones can cause wind-dependent forces acting on the wind energy installation which considerably exceed the loads resulting from a once-a-century gust.

Guys are known for stabilization of buildings in general against external influences, in particular wind. In this case, a plurality of cables, chains or the like which originate from the building to be stabilized are tensioned, and are anchored in the ground. However, the permanent use of guys such as these for wind energy installations would have considerable disadvantages. This is because wind energy installations are subject to dynamic loads. The forces introduced into the wind energy installation as a result of the guys—particularly as a result of the dynamic loads on the wind energy installations—would lead to fatigue problems at those points or in those areas of the wind energy installation into which the forces are introduced.

BRIEF SUMMARY OF THE INVENTION

One object of the present invention is therefore to specify a method for operation or stabilization of a wind energy installation, by means of which the wind energy installation can be stabilized as optimally as possible, while the corresponding stabilization measures result in as little load as possible on the wind energy installation, at the same time.

A further object of the invention is to specify a wind energy installation which can be operated using this method.

This object is achieved by a method for operation of a wind energy installation having a rotor which can be driven by wind and has at least one rotor blade, having a generator for conversion of the mechanical energy of the rotor to electrical energy, and having a tower on which the rotor is arranged, characterized in that, in order to guy the wind energy installation, a guy apparatus is changed as required automatically from an unstressed state—or at least less-stressed state—to a stressed state—or at least more-stressed state—which stabilizes the wind energy installation.

Accordingly, according to the invention, in order to guy the wind energy installation, a guy apparatus is changed as required automatically from an unstressed state—or at least less-stressed state—to a stressed state—or at least more-stressed state—which stabilizes the wind energy installation.

For the sake of simplicity, the following text refers exclusively to a "stressed" or an "unstressed" state. The features of the present invention which are described in the following text in conjunction with these states are intended to relate—without this being expressly mentioned—to the abovementioned change of the guy apparatus from a "less-stressed state" to a "more-stressed state", as well.

The particular advantage of the invention is, in particular, that the wind energy installation is guyed only when necessary. The guy apparatus is activated only when stabilization of the wind energy installation is necessary, for example as a result of the current wind conditions. The guy apparatus is unstressed when not activated, so that no guy-dependent forces loading the installation are introduced into the wind energy installation. This effectively reduces fatigue on those components of the wind energy installation which are loaded by the guy. One further particular advantage of the invention is that the guy apparatus is automatically changed from the unstressed state to the stressed state.

The guy apparatus is preferably changed from the unstressed state to the stressed state as a function of current wind conditions and/or wind conditions to be expected in the future, in particular storm gusts or the like, and/or as a function of current earth movements and/or earth movements to be expected. The guy apparatus is accordingly stressed in order to stabilize the wind energy installation when the wind conditions or other external influences make this necessary. If, by way of example, prediction systems predict storms with such a high wind speed that the wind energy installation could be damaged, the guy apparatus can be stressed. A similar situation exists in the case of currently measured earth (ground) movements or earthquakes or when such events are to be expected, which could cause the wind energy installation to oscillate, so that additional guying could appear worthwhile.

In one particular embodiment of the present invention, the guy apparatus can be stressed, that is to say it is changed from the unstressed state to the stressed state, once, for example, a critical storm and/or earthquake has been predicted by a specialized institute. In this case, the institute making the prediction can send an activation signal, in particular from an appropriate signal generator, to a control device for the wind energy installation, for example an electromagnetic signal such as a radio signal, a signal which can be transmitted via the Internet, or the like. The control device can then initiate the stressing of the guy apparatus as a function of the activation signal.

In a further embodiment, it is possible to provide for the wind conditions and/or the ground movements at the location of the wind energy installation and/or in the physical vicinity of the wind energy installation to be recorded by means of suitable sensors, in particular on the side of the wind energy installation facing the wind. However, the wind conditions can also be derived from operating parameters of the wind energy installation, for example from the rotation speed of the rotor, the wind incidence angle of the rotor blade or the like. The guy apparatus can then be changed from the unstressed state to the stressed state as a function of the wind conditions and/or earth movements determined in this way.

The guy apparatus is preferably changed from the unstressed state to the stressed state when a characteristic value which characterizes the wind conditions and/or the earth movements exceeds a predetermined limit value.

The guy apparatus is preferably changed back to the unstressed state again when the wind conditions and/or the earth movements allow this. This may be done in particular after a predetermined time period has elapsed and/or as a function of current wind conditions and/or wind conditions to be expected, and/or as a function of current earth movements, and/or earth movements to be expected. When no more loads on the wind energy installation are to be expected or are currently being measured on this basis, the reverse change can be initiated in order to free the wind energy installation of the loads produced by the guying.

The object of the present invention is also achieved by a wind energy installation having a rotor which can be driven by wind and has at least one rotor blade, having a generator for conversion of the mechanical energy of the rotor to electrical energy, having a tower on which the rotor is arranged, characterized by a guy apparatus which has tensioning means, which can be tensioned controllably and can be changed as required automatically from an unstressed state—or at least from a less-stressed state—to a stressed state—or at least to a more-stressed state—which stabilizes the wind energy installation.

Accordingly, a wind energy installation which is being operated using the method as described above has a guy apparatus which has tensioning means, which can be tensioned controllably and can be changed as required automatically from an unstressed state or to a stressed state which stabilizes the wind energy installation.

The tensioning means may, for example, be cables, chains or the like which are connected at one end to the tower of the wind energy installation and/or to the nacelle. The tensioning means are preferably anchored or can be anchored, at the other end directly or indirectly in the ground. In this embodiment, the tensioning means run obliquely downward, starting from the wind energy installation, to the respective anchorage points in the ground, which are arranged around the wind energy installation.

The guy apparatus can be controlled by means of an open-loop/closed-loop control device as a function of the wind conditions and/or earth movements which are currently being recorded and/or are to be expected in the future. The tensioning means are accordingly stressed when this is necessary as a result of the wind conditions and/or the earth movements.

For automatic stressing of the tensioning means, the guy apparatus can have a motor, in particular electric-motor, hydraulic or pneumatic drive, via which the tensioning means can be stressed.

In one particularly preferred embodiment of the present invention, the rotor of the wind energy installation is braked before the guy apparatus is changed from the unstressed state to the stressed state, in particular by suitable variation of the wind incidence angle on the rotor blades and/or by operation of mechanical rotor brakes. Since the rotor blades are braked before the guy apparatus is stressed, the tensioning means of the guy apparatus can be stressed without impediment without any need to be concerned about collisions between the tensioning means and the rotor blades as a result of the rotation of the rotor blades. The tensioning means, for example the cables, can then be attached to the tower of the wind energy installation for example particularly high up, without the cables, which run obliquely downwards from the tower in the stressed state, being hit by the rotating rotor blades.

BRIEF DESCRIPTION OF THE DRAWINGS

Further features of the present invention are specified in the attached dependent claims, in the following description of one preferred exemplary embodiment, and in the attached drawing, in which:

DETAILED DESCRIPTION OF PREFERRED EMBODIMENTS

Figure 1:
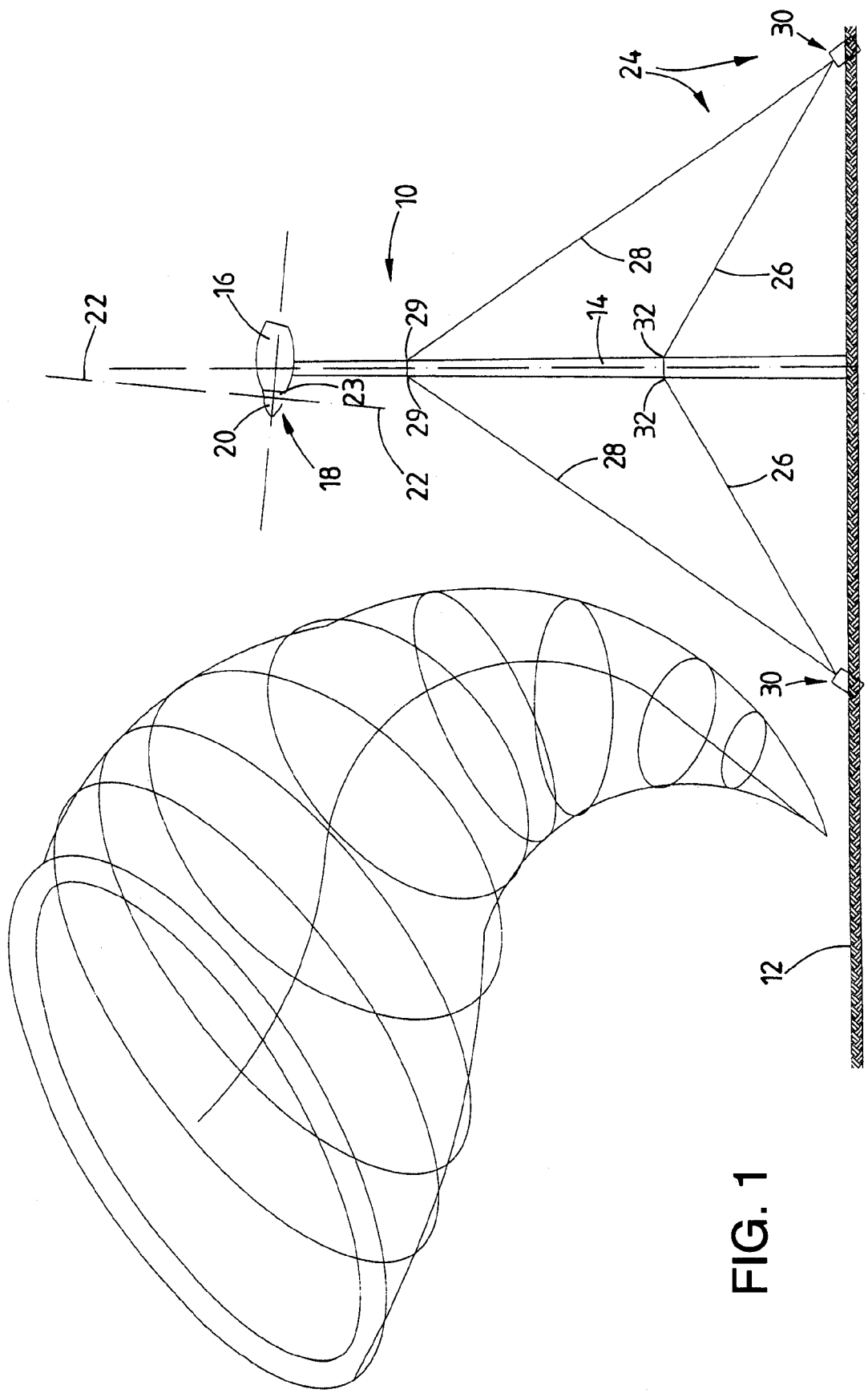
FIG. 1 shows a schematic side view of a wind energy installation according to the invention with a guy apparatus.

FIG. 1 shows a wind energy installation 10. The wind energy installation 10 has a nacelle 16, which is arranged at the top of the tower, at the upper end of a vertical tower 14 which is arranged on a horizontal base 12. As a person skilled in the art knows from the prior art, many embodiments are feasible for the detailed design of a tower 14 for a wind energy installation 10. The invention is not, of course, restricted to the truncated-conical form of the tower 14 described in the drawing.

A rotor 18 is arranged at an end of the nacelle 16 facing the wind, and has a hub 20. Three rotor blades 22 are connected to the hub 20, with the rotor blade roots 23 of the rotor blades 22 being inserted into appropriate openings in the hub 20, and being connected to it in a known manner.

The rotor 18 rotates about an axis which is inclined slightly upward with respect to the horizontal. As soon as wind strikes the rotor blades 22, the rotor 18 is caused to rotate about the rotation axis, together with the rotor blades 22. The movement of the rotor shaft is converted to electrical power by a generator which is arranged within the nacelle 16. The rotor blades 22 cover a circular area during rotation. The positions of the rotor blades 22 with respect to the wind can be varied individually by means of an adjustment device, which is not illustrated but is known to those skilled in the art from the prior art, that is to say the incidence angle of the rotor blade 22 with respect to the wind is adjustable. Various functions of the wind energy installation 10 can be controlled by a suitable control device, which is not illustrated.

The wind energy installation 10 is connected to an electricity grid system, into which the electrical energy produced by the generator can be fed.

The basic design of the wind energy installation 10 with an at least approximately horizontal rotor axis is known from the prior art, so that this will not be described in detail.

The tower 14 of the wind energy installation 10 is guyed by means of a guy apparatus 24, that is to say it is stabilized with respect to external influences, such as wind gusts or earth movements, in particular relatively minor earthquakes. The guy apparatus 24 has three upper tensioning means 28 as well as three lower tensioning means 26, which each end at the tower 14 of the wind energy installation 10. Only four tensioning means of the tensioning means 26, 28 can in this case be seen in the present side view. All of the tensioning means 26, 28 are in the form of cables.

The upper tensioning means 28 are connected to the tower 14 in its upper third. Starting from the attachment points 29, they run obliquely downwards and end in the immediate vicinity of the tower 14 at anchoring devices 30 for the guy apparatus 24.

The anchoring devices 30 are anchored in the ground 12 by means of anchoring foundations, which are not shown.

The lower tensioning means 26 are connected to the tower 14 in its lower half. Starting from attachment points 32, they likewise run obliquely downwards to the anchoring devices 30 for the guy apparatus 24.

The anchoring devices 30 for the guy apparatus 24 have drives, specifically electric motors, via which the tensioning means 26, 28 can be changed by means of cable winches, which are not illustrated, from an unstressed state, which is not illustrated, to the stressed state as shown in FIG. 1. For this purpose, the tensioning means 26, 28 are each wound up in a manner known per se by means of the cable winches onto appropriate cable winch drums. In order to change the tensioning means 26, 28 back to the unstressed state, the tensioning means 26, 28 can be unwound from the cable winch drum. In the unstressed state, the tensioning means 26, 28, that is to say the cables, hang down loosely adjacent to the tower 14 in places, and lie on the ground 12 in places.

The guy apparatus 24 can be controlled by means of an open-loop/closed-loop control device, which is associated with the wind energy installation 10, as a function of the currently recorded wind conditions and/or earth movements and/or similar events to be expected in the future. The tensioning means 26, 28 are automatically stressed in a corresponding manner when this is necessary as a result of the wind conditions and/or the earth movements.

Specifically, the guy apparatus 24 is changed from the unstressed state to the stressed state as a function of an activation signal which is transmitted to the open-loop/closed-loop control device directly or indirectly from an institute predicting wind and/or earth movements.

Alternatively or additionally it is feasible for the wind conditions and/or the earth movements at the location of the wind energy installation 10 and/or in the physical vicinity of the wind energy installation 10 to be recorded by means of suitable sensors, in particular on the side of the wind energy installation 10 facing the wind. The wind conditions can also be derived from operating parameters of the wind energy installation 10, for example from the rotation speed of the rotor 18, from the wind incidence angle of the rotor blade 22, or the like.

The guy apparatus 24 is changed back to the unstressed state after a predetermined time period has elapsed and/or as a function of current wind conditions and/or as a function of current earth movements.

LIST OF REFERENCE SYMBOLS

10 Wind energy installation
12 Base
14 Tower
16 Nacelle
18 Rotor
20 Hub
22 Rotor blades
23 Rotor blade root
24 Guy apparatus
26 Lower tensioning means
28 Upper tensioning means
29 Attachment points
30 Anchoring device
32 Attachment points

What is claimed is:

1. A method for operation of a wind energy installation having a rotor (18) that can be driven by wind and that has at least one rotor blade (22), having a generator for conversion of the mechanical energy of the rotor (18) to electrical energy, and having a tower (14) on which the rotor (18) is arranged, comprising, in order to guy the wind energy installation (10), automatically changing a guy apparatus (24) as required from an unstressed state in which no guy-dependent forces loading the wind energy installation are introduced into the wind enemy installation to a stressed state that stabilizes the wind energy installation (10).

2. The method according to claim 1, wherein the guy apparatus (24) is changed from the unstressed state to the stressed state as a function of at least one external influence selected from the group consisting of current wind conditions, wind conditions to be expected in the future, storm gusts, current earth movements, earth movements to be expected in the future, earthquakes, and combinations thereof.

3. The method according to claim 2, wherein the guy apparatus (24) is changed from the unstressed state to the stressed state when a characteristic value which characterizes the at least one external influence exceeds a predetermined limit value.

4. The method according to claim 3, wherein the guy apparatus (24) is changed back to the unstressed state after a predetermined time period has elapsed and/or as a function of the at least one external influence.

5. The method according to claim 1, wherein the guy apparatus (24) is changed from the unstressed state to the stressed state as a function of an activation signal which is transmitted to a control device, which is associated with the wind energy installation (10), directly or indirectly from an institute which predicts wind and/or earth movements.

6. The method according to claim 1, wherein the rotor (18) of the wind energy installation (10) is braked before the guy apparatus is changed from the unstressed state to the stressed state by suitable variation of the wind incidence angle of the rotor blades (22) and/or by operation of mechanical rotor brakes.

7. The method according to claim 2, wherein operating parameters of the wind energy installation (10) are selected from the group consisting of the rotation speed of the rotor (18), the wind incidence angle of the rotor blade (22), and combinations thereof.

8. A method for operation of a wind energy installation having a rotor (18) that can be driven by wind and that has at least one rotor blade (22), having a generator for conversion of the mechanical energy of the rotor (18) to electrical energy, and having a tower (14) on which the rotor (18) is arranged, comprising:
automatically changing a guy apparatus (24) as required in order to guy the wind energy installation (10) from an unstressed state, in which no guy-dependent forces loading the wind energy installation are introduced into the wind energy installation, to a stressed state, which stabilizes the wind energy installation (10);
wherein the guy apparatus (24) is changed from the unstressed state to the stressed state when a characteristic value which characterizes at least one external influence exceeds a predetermined limit value.

9. The method according to claim 8, wherein the guy apparatus (24) is changed back to the unstressed state after a predetermined time period has elapsed and/or as a function of the at least one external influence.

10. The method according to claim 8, wherein the at least one external influence is selected from the group consisting of current wind conditions, wind conditions to be expected in the future, storm gusts, current earth movements, earth movements to be expected in the future, earthquakes, and combinations thereof.

11. The method according to claim 9, wherein the at least one external influence is selected from the group consisting of current wind conditions, wind conditions to be expected in the future, storm gusts, current earth movements, earth movements to be expected in the future, earthquakes, and combinations thereof.

12. The method according to claim 8, wherein the guy apparatus (24) is changed from the unstressed state to the stressed state as a function of an activation signal which is transmitted to a control device, which is associated with the wind energy installation (10), directly or indirectly from an institute which predicts wind and/or earth movements.

13. The method according to claim 8, wherein the rotor (18) of the wind energy installation (10) is braked before the guy apparatus is changed from the unstressed state to the stressed state by suitable variation of the wind incidence angle of the rotor blades (22) and/or by operation of mechanical rotor brakes.

14. A method for operation of a wind energy installation having a rotor (18) that can be driven by wind and that has at least one rotor blade (22), having a generator for conversion of the mechanical energy of the rotor (18) to electrical energy, and having a tower (14) on which the rotor (18) is arranged, comprising:

automatically changing a guy apparatus (24) as required in order to guy the wind energy installation (10) from an unstressed state, in which no guy-dependent forces loading the wind energy installation are introduced into the wind energy installation, to a stressed state, which stabilizes the wind energy installation (10); and automatically changing the guy apparatus (24) back to the unstressed state;

wherein the guy apparatus (24) is changed from the unstressed state to the stressed state when a characteristic value which characterizes at least one external influence exceeds a predetermined limit value; and wherein the guy apparatus (24) is changed from the stressed stated back to the unstressed state after a predetermined time period has elapsed and/or as a function of the at least one external influence.

15. The method according to claim 14, wherein the at least one external influence is selected from the group consisting of current wind conditions, wind conditions to be expected in the future, storm gusts, current earth movements, earth movements to be expected in the future, earthquakes, and combinations thereof.

16. The method according to claim 15, wherein the guy apparatus (24) is changed from the unstressed state to the stressed state as a function of an activation signal which is transmitted to a control device, which is associated with the wind energy installation (10), directly or indirectly from an institute which predicts wind and/or earth movements.

17. The method according to claim 16, wherein the rotor (18) of the wind energy installation (10) is braked before the guy apparatus is changed from the unstressed state to the stressed state by suitable variation of the wind incidence angle of the rotor blades (22) and/or by operation of mechanical rotor brakes.

* * * * *